(12) United States Patent
Szyszka et al.

(10) Patent No.: US 9,930,702 B2
(45) Date of Patent: Mar. 27, 2018

(54) METHOD, DEVICE, AND SYSTEM FOR TRANSMITTING SHORT DATA DURING AN ACTIVE TDMA CALL

(71) Applicant: MOTOROLA SOLUTIONS, INC, Schaumberg, IL (US)

(72) Inventors: Grzegorz Szyszka, Cracow (PL); Przemyslaw Bogucki, Cracow (PL); Krzysztof Minior, Rudawa (PL); Bartlomiej Olejak, Cracow (PL); Grzegorz Marcin Pawlik, Wieliczka (PL); Mariusz R. Wawrowski, Wawrzenczyce (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 207 days.

(21) Appl. No.: 14/945,879

(22) Filed: Nov. 19, 2015

(65) Prior Publication Data

US 2016/0143031 A1    May 19, 2016

(30) Foreign Application Priority Data

Nov. 19, 2014    (EP) .................................... 14460092

(51) Int. Cl.
*H04W 76/00* (2018.01)
*H04W 4/00* (2018.01)
*H04W 4/20* (2018.01)

(52) U.S. Cl.
CPC ......... *H04W 76/005* (2013.01); *H04W 4/005* (2013.01); *H04W 4/20* (2013.01)

(58) Field of Classification Search
CPC ...... H04W 76/005; H04W 4/20; H04W 4/005
See application file for complete search history.

(56) References Cited

U.S. PATENT DOCUMENTS 5,517,504 A * 5/1996 Tran .................. H04W 74/0816
370/347
5,521,925 A * 5/1996 Merakos ............... H04J 3/1694
370/337

(Continued)

FOREIGN PATENT DOCUMENTS

AU    716719    3/2000
EP    1806949    7/2007

(Continued)

OTHER PUBLICATIONS

EP14460092.1 Extended European Search Report dated May 26, 2015 (5 pages).

*Primary Examiner* — Tejis Daya (57) ABSTRACT

A mobile radio (MR) transmits short data during an active time division multiple access (TDMA) call in a wireless communication system. The mobile radio receives first communication media (CM) of the active call in a first slot of a first outbound TDMA logical channel (FLC) of an outbound traffic frequency having a slotting ratio n>=2. The MR transmits short data during at least a portion of a second slot of the FLC, pending short data on an inbound logical data channel of an inbound traffic frequency. The MR then receives second CM of the active call in a third slot of the FLC, and receives missed CM of the active call without specifically identifying the missed CM in any request for re-transmission of missed CM, in a first slot of a second outbound TDMA logical channel of the outbound traffic frequency.

16 Claims, 5 Drawing Sheets

(56) References Cited

U.S. PATENT DOCUMENTS

| | | | | |
|---|---|---|---|---|
| 5,729,541 | A * | 3/1998 | Hamalainen | H04B 7/2656 370/337 |
| 5,822,311 | A * | 10/1998 | Hassan | H04B 7/2125 370/322 |
| 5,966,378 | A * | 10/1999 | Hamalainen | H04W 72/02 370/329 |
| 6,763,015 | B1 | 7/2004 | Phillips et al. | |
| 6,944,137 | B1 * | 9/2005 | Pan | H04W 4/10 340/10.32 |
| 7,483,407 | B2 | 1/2009 | McDonald et al. | |
| 7,656,838 | B2 | 2/2010 | Fauconnier et al. | |
| 7,974,246 | B1 * | 7/2011 | Fulthorp | H04W 74/02 370/337 |
| 8,005,053 | B2 | 8/2011 | Schmidt | |
| 8,331,269 | B2 | 12/2012 | Li et al. | |
| 8,503,409 | B2 * | 8/2013 | Bohn | H04W 74/0808 370/337 |
| 2002/0071402 | A1 * | 6/2002 | Kockmann | H04B 1/715 370/330 |
| 2002/0173327 | A1 * | 11/2002 | Rosen | H04M 3/42 455/518 |
| 2004/0032853 | A1 * | 2/2004 | D'Amico | H04L 1/1893 370/349 |
| 2004/0114598 | A1 | 6/2004 | Veerepalli | |
| 2005/0201317 | A1 * | 9/2005 | Bohn | H04W 28/18 370/320 |
| 2006/0229090 | A1 | 10/2006 | LaDue | |
| 2006/0256822 | A1 * | 11/2006 | Kwong | H04L 29/06027 370/503 |
| 2009/0219916 | A1 * | 9/2009 | Bohn | H04W 74/0816 370/347 |
| 2009/0319854 | A1 * | 12/2009 | Qian | H04L 1/1671 714/750 |
| 2010/0074232 | A1 * | 3/2010 | Hwang | H04B 7/2646 370/336 |
| 2010/0220677 | A1 * | 9/2010 | Li | H04L 1/1835 370/329 |
| 2011/0032925 | A1 * | 2/2011 | Lee | H04L 1/1621 370/345 |
| 2011/0267939 | A1 | 11/2011 | Streed et al. | |
| 2012/0014281 | A1 * | 1/2012 | Chun | H04W 72/087 370/252 |
| 2012/0102131 | A1 * | 4/2012 | Lin | H04L 12/66 709/207 |
| 2012/0122510 | A1 * | 5/2012 | Mistro | H04W 72/121 455/519 |
| 2013/0021924 | A1 * | 1/2013 | Ericson | H04L 1/1825 370/252 |
| 2013/0022053 | A1 * | 1/2013 | Vasseur | H04L 47/10 370/428 |
| 2013/0121132 | A1 * | 5/2013 | Terry | H04W 24/08 370/216 |
| 2014/0086216 | A1 * | 3/2014 | Yang | H04L 1/1614 370/335 |
| 2015/0135024 | A1 * | 5/2015 | Caverni | G06F 11/0793 714/704 |
| 2016/0226627 | A1 * | 8/2016 | Nabetani | H04L 1/16 |
| 2017/0208444 | A1 * | 7/2017 | He | H04W 4/203 |

FOREIGN PATENT DOCUMENTS

| | | | |
|---|---|---|---|
| EP | 2219396 | 8/2010 | |
| EP | 2678964 | 1/2014 | |
| GB | 2376380 | 12/2012 | |
| WO | 2001045335 | 6/2001 | |
| WO | 2004053114 | 6/2004 | |
| WO | WO 2007148138 A1 * | 12/2007 | H04L 1/1877 |
| WO | 2008099171 | 8/2008 | |
| WO | 2012113449 | 8/2012 | |

* cited by examiner

METHOD, DEVICE, AND SYSTEM FOR TRANSMITTING SHORT DATA DURING AN ACTIVE TDMA CALL

This application is a US National Filing and is filed within one year of, and claims priority to under 35 U.S.C. § 119, European Patent Application No. EP 14460092.1, filed in the European Patent Office on Nov. 19, 2014, the entire contents of which are incorporated herein by reference.

BACKGROUND OF THE INVENTION

Wireless communication systems provide for radio communication links to be arranged within the system between a plurality of user terminals. Such user terminals may be mobile and may therefore be known as mobile radios. At least one other terminal, e.g. used in conjunction with mobile radios, may be a fixed terminal, e.g. a control terminal, base station, or access point. Such a system typically includes a system infrastructure which generally includes a network of various fixed installations such as base stations, which are in direct radio communication with the mobile radios. Each of the base stations operating in the system may have one or more transceivers which may, for example, serve mobile radios in a given local region or area, known as a 'cell' or 'site', by radio frequency (RF) communication. The mobile radios which are in direct communication with a particular base station are said to be served by the base station, and all radio communications to and from each mobile radios within the system are made via respective serving base stations. Sites of neighbouring base stations in a wireless communication system may be offset from one another or may be overlapping.

Wireless communication systems may operate according to an industry standard land mobile radio (LMR) protocol such as, for example, the Project 25 (P25) standard defined by the Association of Public Safety Communications Officials International (APCO), the Digital Mobile Radio (DMR) standard, Terrestrial Trunked Radio (TETRA) or other radio protocols. Communications in accordance with DMR, P25, TETRA, or other standards may take place over physical channels in accordance with one or more of a TDMA (time division multiple access) protocol, a FDMA (frequency divisional multiple access), or CDMA (code division multiple access) protocol. Mobile radios in wireless communication systems such as DMR systems send and receive user communicated voice data (e.g., voice or audio alone or multiplexed with other data such as video or image data) and non-voice data (e.g., location data or sensor data, control signaling, etc.), herein referred to collectively as 'traffic information', in accordance with the designated protocol.

Furthermore, LMR systems may operate in either a conventional or trunked configuration. In either configuration, a plurality of mobile radios may be partitioned into separate groups of mobile radios, such that mobile radios may selectively participate in individual (mobile radio to mobile radio) calls and also in group (mobile radio to many mobile radios) calls.

In a conventional system, each mobile radio in a group is selected to a particular FDMA frequency for communications associated with that mobile radio's group. Thus, each group is served by one frequency (e.g., channel), and multiple groups may share the same single frequency (in which case, in some embodiments, group IDs may be present in the group data to distinguish between groups using the same shared frequency). In some systems, each conventional frequency may be further configured to carry multiple logical channels via a TDMA protocol, which allows for multiple concurrent calls on each frequency based on the configured slotting ratio of the TDMA channels (e.g., a slotting ratio of 2 allows 2 distinct logical channels, etc.). Each logical channel may comprise a repeating set of a single time slot or of multiple time slots interleaved with the other remaining logical channels.

In contrast, a trunked radio system and its mobile radios use a pool of traffic channels (e.g., FDMA or TDMA protocols operating on a plurality of available physical frequencies) for virtually an unlimited number of groups of mobile radios (e.g., talkgroups). Thus, all groups are served by all channels. The trunked radio system works to take advantage of the probability that not all groups need a traffic channel for communication at the same time. When a member of a group requests a call on a control or rest channel on which all of the mobile radios in the system idle awaiting new call notifications and other signaling, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the mobile radios were idling to a traffic channel for the call, and instruct all mobile radios that are not participating in the new call to move to a newly assigned control or rest channel selected from the pool of available channels. With a given number of channels, a much greater number of groups can be accommodated in a trunked system as compared with conventional radio systems.

Group members for group calls conducted on conventional or trunked systems may be statically or dynamically defined. That is, in a first example, a user or administrator working on behalf of the user may indicate to the switching and/or radio network (perhaps at a call controller, push-to-talk (PTT) server, zone controller, or mobile management entity (MME), base station controller (BSC), mobile switching center (MRC), site controller, Push-to-Talk controller, or other network device) a list of participants of a group at the time of the call or in advance of the call. The group members (e.g., mobile radios) could be provisioned in the network by the user or an agent, and then provided some form of group identity, identifier, or address, for example. Then, at a future time, an originating user in a group may cause some signaling to be transmitted indicating that he or she wishes to establish a communication session (e.g., group call) with each of the pre-designated participants in the defined group. In another example, mobile radios may dynamically affiliate with a group (and also disassociate with the group) perhaps based on user input, and the switching and/or radio network may track group membership and route new group calls according to the current group membership.

Many wireless communication systems, including many LMR systems, provide for non-voice data transmission capabilities on a same traffic channel as voice communications, on one or more separate data revert channels, or opportunistically on other available voice or data channels. Data transmission capabilities may be used to periodically or semi-periodically (e.g., intermittently) report location information of mobile radios, determined via a GPS system, triangulation process, or some other method, or to periodically or semi-periodically report other types of data such as sensor information. Reported sensor information may include environmental conditions surrounding the mobile radio or health conditions (e.g., pulse rate, temperature, oxygen level, breath rate, etc.) of the mobile radio's user, amongst many other possibilities. Such location and sensor information is usually short in nature (e.g., does not require a large amount of bandwidth to transmit, and can normally be transmitted in under one second), but is reported in a periodic or semi-periodic manner so that infrastructure applications, devices, and/or dispatchers can be provided with updated information over time. Other types of short data may be transmitted as well.

As the number of applications that utilize or depend upon such short data transmissions grow, the number and frequency of such transmissions has grown as well. One problem that has arisen with respect to the transmission of short data from mobile radios during group or individual calls is that calls having an excessive duration impair the ability of any one particular mobile radio participating in the call from reporting such short data. In other words, while a particular mobile radio is participating in call activity (e.g., transmitting and/or receiving voice, audio, or video to and/or from one or more other mobile radios) it is unable to transmit the short data. As a result, applications, devices, and/or dispatchers in the infrastructure relying upon the short data transmissions are starved of data, which could lead to negative consequences, especially in first responder wireless communications systems.

Accordingly, what is needed is an improved method, device, and system for transmitting short data during an active TDMA call in a wireless communication system.

DETAILED DESCRIPTION OF THE INVENTION

Disclosed is an improved method, device, and system for transmitting short data during an active time division multiple access (TDMA) call in a wireless communication system.

In one embodiment, a process for transmitting short data during an active TDMA call in a wireless communication system includes: receiving, via a transceiver at a mobile radio, first communication media of an active call in a first slot of a first outbound TDMA logical channel of an outbound traffic frequency having a slotting ratio n>=2, detecting, at the mobile radio, a request to transmit short data, and responsively, transmitting, via the transceiver, during at least a portion of a second slot of the first logical channel, pending short data on an inbound logical data channel of an inbound traffic frequency, after transmitting the short data on the inbound logical data channel, receiving, via the transceiver: second communication media of the active call in a third slot of the first logical channel; and missed communication media of the active call missed during transmitting of the pending short data without specifically identifying the missed communication media in any request for re-transmission of missed communication media, in a first slot of a second outbound TDMA logical channel of the outbound traffic frequency; and playing back media from the missed and the second communication media.

In another embodiment, a mobile radio in a wireless network includes: a speaker, a display, a microphone, a transceiver, a processor; and a computer readable medium having instructions stored thereon that, in response to execution by the processor, cause the mobile radio to perform a set of functions comprising: receiving, via the transceiver, first communication media of an active call in a first slot of a first outbound TDMA logical channel of an outbound traffic frequency having a slotting ratio n>=2; detecting a request to transmit short data, and responsively: transmitting, via the transceiver, during at least a portion of a second slot of the first logical channel, pending short data on an inbound logical data channel of an inbound traffic frequency, after transmitting the short data on the inbound logical data channel, receiving, via the transceiver: second communication media of the active call in a third slot of the first logical channel; and missed communication media of the active call missed during transmitting of the pending short data without specifically identifying the missed communication media in any request for re-transmission of missed communication media, in a first slot of a second outbound TDMA logical channel of the outbound traffic frequency, and playing back, via one or more of the speaker and the display, media from the missed and the second communication media.

In a still further embodiment, a radio controller in a wireless infrastructure network includes: a transceiver, a processor, and a computer readable medium having instructions stored thereon that, in response to execution by the processor, cause the mobile radio to perform a set of functions comprising: causing, during an active call, first communication media of the active call to be provided to a first mobile radio in a first slot of a first outbound TDMA logical channel of an outbound traffic frequency having a slotting ratio n>=2, during the active call, receiving, from the first mobile radio via an inbound logical data channel of an inbound traffic frequency, short data associated with the first mobile radio, identifying a missed communication media transmission of the active call provided in a second slot of the first outbound TDMA logical channel while the first mobile radio was transmitting the short data, during the active call, causing the identified missed communication media transmission to be re-transmitted to the first mobile radio in a first slot of a second outbound TDMA logical channel of the outbound traffic frequency without receiving a request specifically identifying the missed communication media in any request for re-transmission.

Each of the above-mentioned embodiments will be discussed in more detail below, starting with example network and device architectures of systems in which the embodiments may be practiced, followed by a discussion of transmission of short data during an active TDMA call from a system perspective, including in particular, processes executed at a radio controller and mobile radios of the wireless communication system. Further advantages and features consistent with this disclosure will be set forth in the following detailed description, with reference to the figures.

I. Network and Device Architecture

Figure 1:
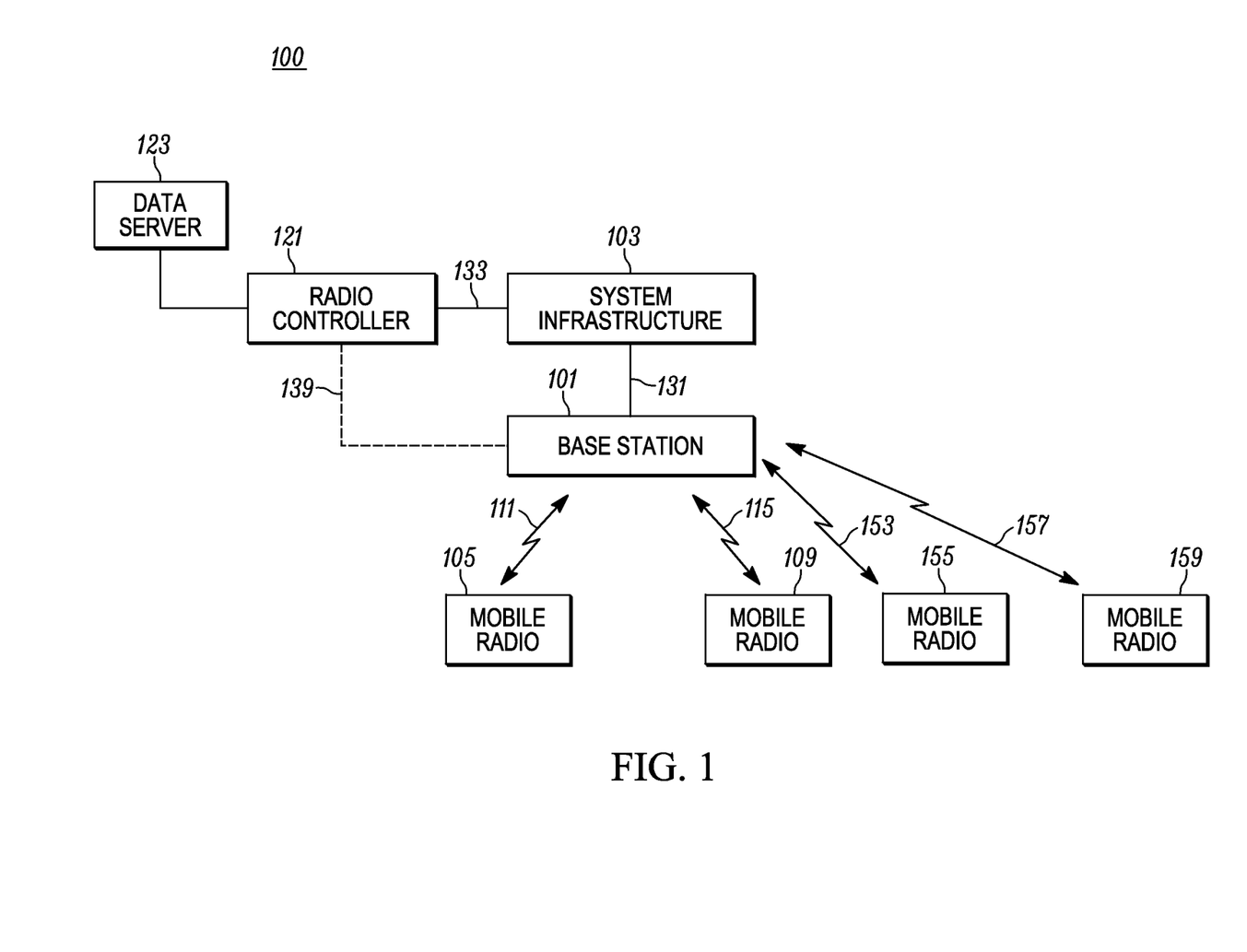
FIG. 1 is a schematic diagram of a wireless communication system in accordance with an embodiment.

FIG. 1 shows a wireless radio communication system 100 that may be adapted in accordance with an embodiment of the disclosure. It will be apparent to those skilled in the art that the system 100 and the components that are to be described as operating therein may take a number of forms well known to those skilled in the art. Thus, the layout of the system 100, and of its operational components to be described, should be regarded as illustrative rather than limiting. The system 100 of FIG. 1 will be described as an illustrative wireless communication system such as a system capable of operating in accordance with the P25 standard, the TETRA standard, and/or the DMR standard, but may be equally applied to other currently known and/or future standards protocols.

The system 100 shown in FIG. 1 includes one or more base stations 101 operably connected to a system infrastructure 103 via respective wired or wireless links 131. As used herein, the term "base station" (BS) refers to any entity that includes a transmitter and/or receiver to perform the functionality of receiving traffic information from a signal source (e.g. initiating/transmitting mobile radio 105) and transmitting some or all of the traffic information to one or more signal destinations (e.g, mobile radio 109, mobile radio 155, mobile radio 159, system infrastructure 103, etc.). For example, the BS 101 may comprise, among other possibilities, a cellular wireless base station, a two-way radio repeater, an IEEE 802-based wireless access point, or other similar device.

The BS 101 has radio links with a plurality of mobile radios (MRs), particularly MRs in a service cell or site at least partially defined by a geographic location of the BS 101. In addition, BS 101 may maintain a direct wireless or wired link 139 (or indirect link via system infrastructure 103) with a radio controller 121 or other radio network communications device (such as a zone controller). While the radio controller 121 is illustrated as a separate entity in the system 100, in other embodiments, the radio controller 121 may be integrated with other devices (such as a zone controller) in system infrastructure 103 and/or with BS 101. The radio controller 121 may further be configured to provide registration, authentication, encryption, routing, and/or other services to BS 101 so that MRs operating within its coverage area may communicate with other MRs in the system 100. The radio controller 121 may also track or have access to group subscription information that, for each group identifier associated with a particular group of MRs (e.g., talkgroup), identifies MRs (e.g., by hardware ID, hardware MAC address, IP address, radio ID, International Mobile Subscriber Identity (IMRI), a serial number, or some other unique identifier that can be used to identify subscribed member MRs) that are members of the particular group.

Four MRs 105, 109, 155, 159 are illustrated in FIG. 1 as being within the service area of, and being registered with, BS 101 via respective radio links 111, 115, 153, 157. The radio links 111, 115, 153, 157 may operate according to a conventional or trunked FDMA or TDMA LMR protocol, for example, or some other air-interface protocol. The radio links 111, 115, 153, 157 may represent separate physical or logical channels or a single physical or logical multicast or broadcast channel, or some combination thereof, and each channel may comprise a channel set including an inbound channel portion and a outbound channel portion separated by time, frequency, or code. The BS 101 thereby serves MRs including the MRs 111, 115, 153, 157 with radio communications to and from other terminals, including (i) MRs served by the BS 101, (ii) MRs served by other BSs (not shown), (iii) other terminals including MRs in other systems (not shown) operably linked to the system 100 via the system infrastructure 103, and (iv) other devices communicatively linked to BS 101 such as data server 123, devices in system infrastructure 103, and/or a console device (not shown).

The system infrastructure 103 includes known sub-systems required for operation of the system 100. Such sub-systems may include, for example, sub-systems providing additional authentication, routing, registration, location, system management, encryption, and other operational functions within the system 100. The system infrastructure 103 may also provide routes to other BSs providing cells serving other MRs, and/or may provide access to other external types of networks such as the plain old telephone system (POTS) network or a data-switched network such as the Internet. The system infrastructure 103 may also maintain a separate link 133 to the radio controller 121.

Data server 123 may be a storage device and/or application server that stores and/or otherwise processes data provided by MRs, such as location data or sensor data. Data stored at the data server 123 may be made available (before or after further processing executed at the data server 123) at a display directly coupled to the data server 123, at MRs in the system 100, or at a console device otherwise coupled to the system infrastructure 103, among other possibilities. While the data server 123 is illustrated as a separate entity in the system 100 communicatively linked with the radio controller 121, in other embodiments, the data server 123 may be integrated with other devices in the system 100 such as the radio controller 121, other devices in the system infrastructure 103 such as a zone controller, and/or may otherwise be accessible via one or more of the external types of networks noted above.

Figure 2:
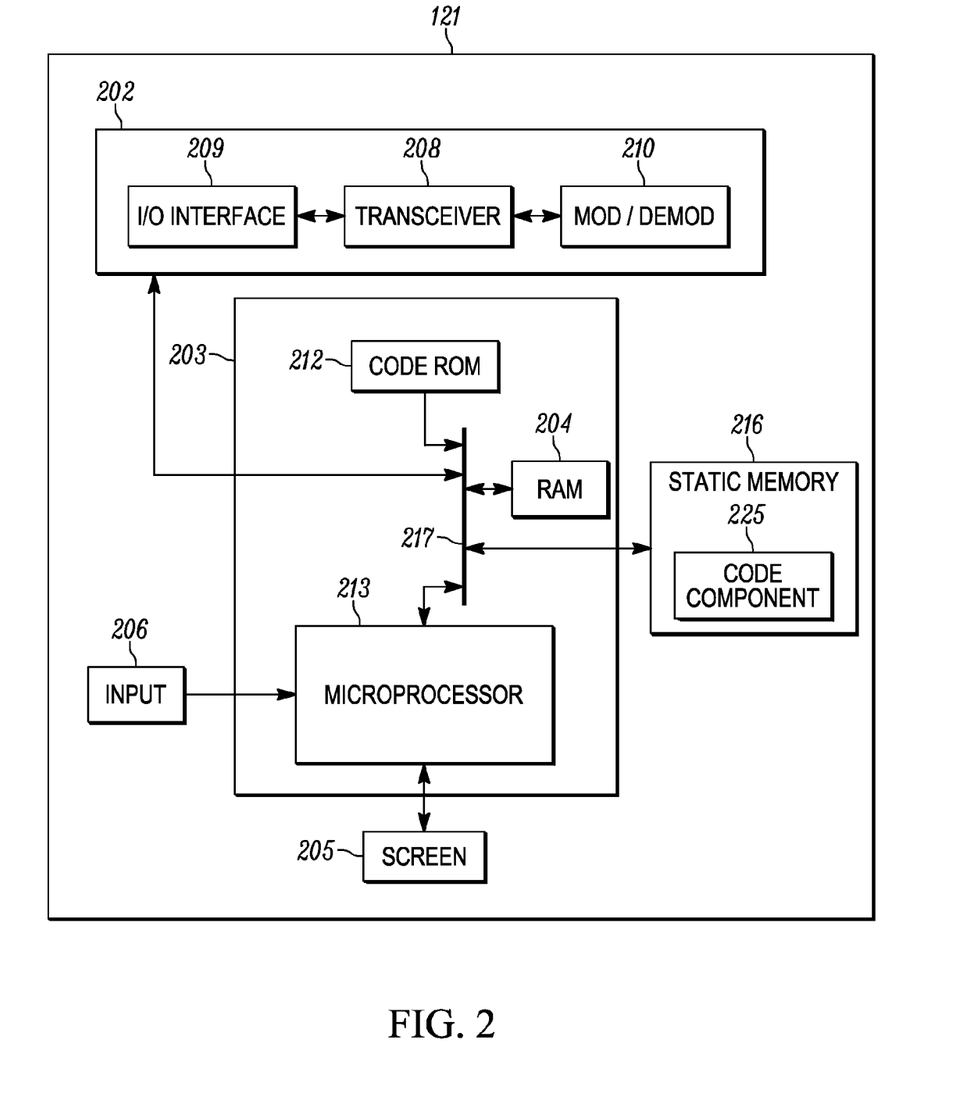
FIG. 2 is a block diagram of an illustrative layout of a radio controller of the system of FIG. 1 in accordance with an embodiment.

FIG. 2 is an example functional block diagram of a radio controller 121 operating within the system 100 of FIG. 1 in accordance with some embodiments. As shown in FIG. 2, radio controller 121 includes a communications unit 202 coupled to a common data and address bus 217 of a processing unit 203. The radio controller 121 may also include an input unit (e.g., keypad, pointing device, etc.) 206 and a display screen 205, each coupled to be in communication with the processing unit 203.

The processing unit 203 may include a code Read Only Memory (ROM) 212 coupled to the common data and address bus 217 for storing data for initializing system components. The processing unit 203 may further include a microprocessor 213 coupled, by the common data and address bus 217, a Random Access Memory (RAM) 204, and a static memory 216.

The communications unit 202 may include one or more wired or wireless input/output (I/O) interfaces 209 that are configurable to communicate with MRs such as MRs 105, 109, with BSs such as BS 101, and/or with other devices in or communicably coupled to the system infrastructure 103. The communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless radio network.

The communications unit 202 may additionally include one or more wireline transceivers 208, such as an Ethernet transceiver, a Universal Serial Bus (USB) transceiver, or similar transceiver configurable to communicate via a twisted pair wire, a coaxial cable, a fiber-optic link or a similar physical connection to a wireline network. The transceiver 208 is also coupled to a combined modulator/demodulator 210.

The microprocessor 213 has ports for coupling to the input unit 206 and to the display screen 205. Static memory 216 may store operating code for the microprocessor 213 that, when executed, performs one or more of the processing, transmitting, and/or receiving steps set forth in FIGS. 4-5 and accompanying text. Static memory 216 may also store, permanently or temporarily, group subscription information that, for each group identifier associated with a particular group of MRs, identifies MRs that are members of the particular group. Additionally or alternatively, static memory 216 may also store, permanently or temporarily, priority information associated with each group identifier that relatively ranks a priority of each MR in a group relative to one another and/or a priority of groups relative to one another. In other embodiments, information disclosed as stored in static memory 216 may additional or instead be stored at an external device such as data server 123 and made accessible to radio controller 121 via communication unit 202. Other types of information could be tracked and/or stored in static memory 216 as well.

Static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, to name a few.

Figure 3:
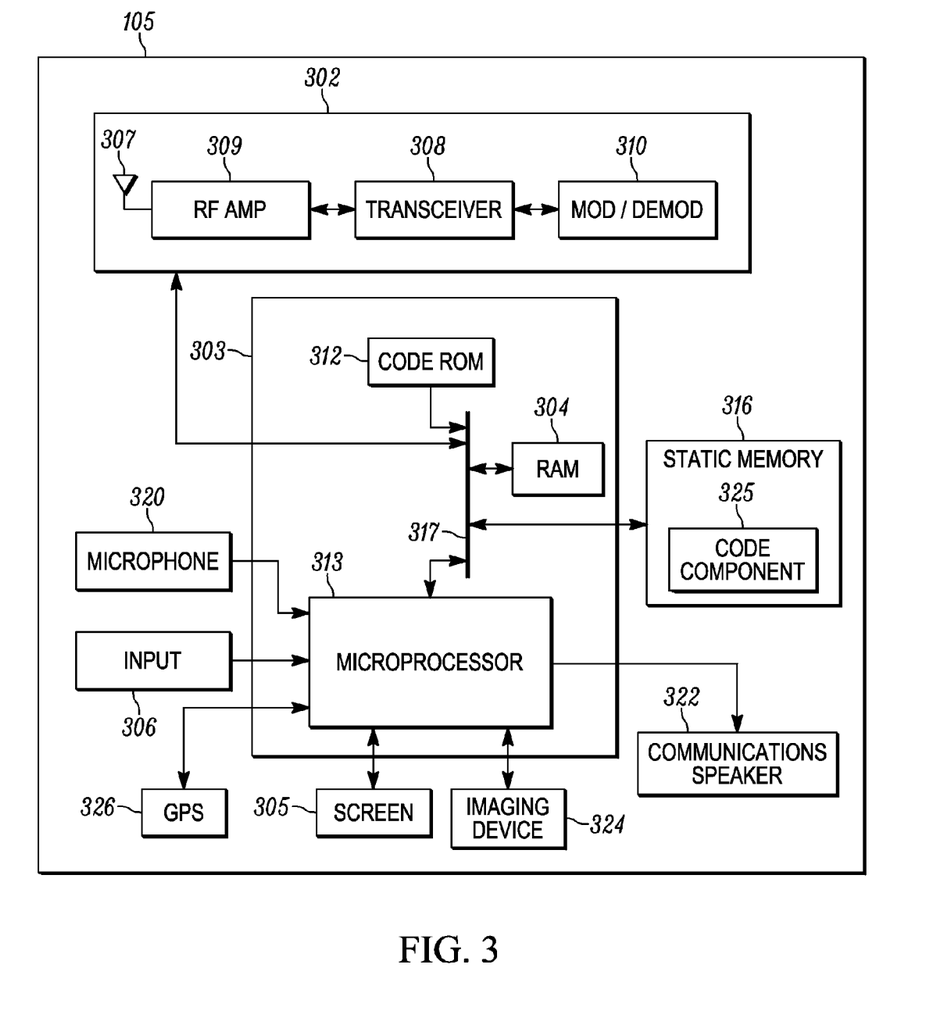
FIG. 3 is a block diagram of an illustrative layout of a mobile radio of the system of FIG. 1 in accordance with an embodiment.

FIG. 3 is an example functional block diagram of a MR such as MR 105 operating within the system 100 of FIG. 1 in accordance with some embodiments. Other MRs such as MRs 109, 155, and 159 may contain same or similar structures. As shown in FIG. 3, MR 105 comprises a radio frequency communications unit 302 coupled to a common data and address bus 317 of a processing unit 303. The MR 105 may also include an input 306 and a display screen 305, each coupled to be in communication with processing unit 303. A microphone 320 captures audio from a user that is further vocoded by processing unit 303 and transmitted as voice data by communication unit 302 to other MRs or the system infrastructure. A communications speaker 322 reproduces audio that is decoded from voice data transmissions received from other MRs or the system infrastructure via the communications unit 302. Display screen 305 may reproduce image or video data decoded from communication media received from other MRs via the communications unit 302. Imaging device 324 captures image or video data that is further encoded by processing unit 303 and transmitted as communication media by communication unit 302 to other MRs or the system infrastructure. A global positioning system (GPS) receiver 326 receives satellite signals as input and calculates a GPS location as a function of the received signals.

The processing unit 303 may also include a code Read Only Memory (ROM) 312 for storing data for initializing system components. The processing unit 303 may further include a microprocessor 313 coupled, by the common data and address bus 317, a Random Access Memory (RAM) 304, and a static memory 316.

The radio frequency communications unit 302 is a combined receiver (or receivers) and transmitter (or transmitters), e.g., transceiver(s) 308, having a common antenna 307. In some embodiments, additional separate or shared antennas may be provided for each one or more transmitter and/or receiver. The radio frequency communications unit 302 has the transceiver 308 coupled to the antenna 307 via a radio frequency amplifier 309. The transceiver 308 may be a transceiver operating in accordance with one or more standard protocols, such as a DMR transceiver, a P25 transceiver, a TETRA transceiver, a Bluetooth transceiver, an LTE transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless network. The transceiver 308 is also coupled to a combined modulator/demodulator 310.

The microprocessor 313 has ports for coupling to the input 306 and to the display screen 305. The microprocessor 313 further has ports for coupling to the microphone 320 and to the speaker 322, and/or other input and output devices. In some embodiments of the present disclosure, the static memory 316 may store operating code for the microprocessor 313 that, when executed by the microprocessor 313, perform one or more of the MR processing, transmitting, and/or receiving steps set forth in FIGS. 5-6 and accompanying text. Static memory 316 may comprise, for example, a HDD, an optical disk drives such as a CD drive or DVD drive, a SSD, a tape drive, a flash memory drive, or a tape drive, to name a few.

II. Process of Transmitting Short Data During an Active TDMA Call

Figure 4:
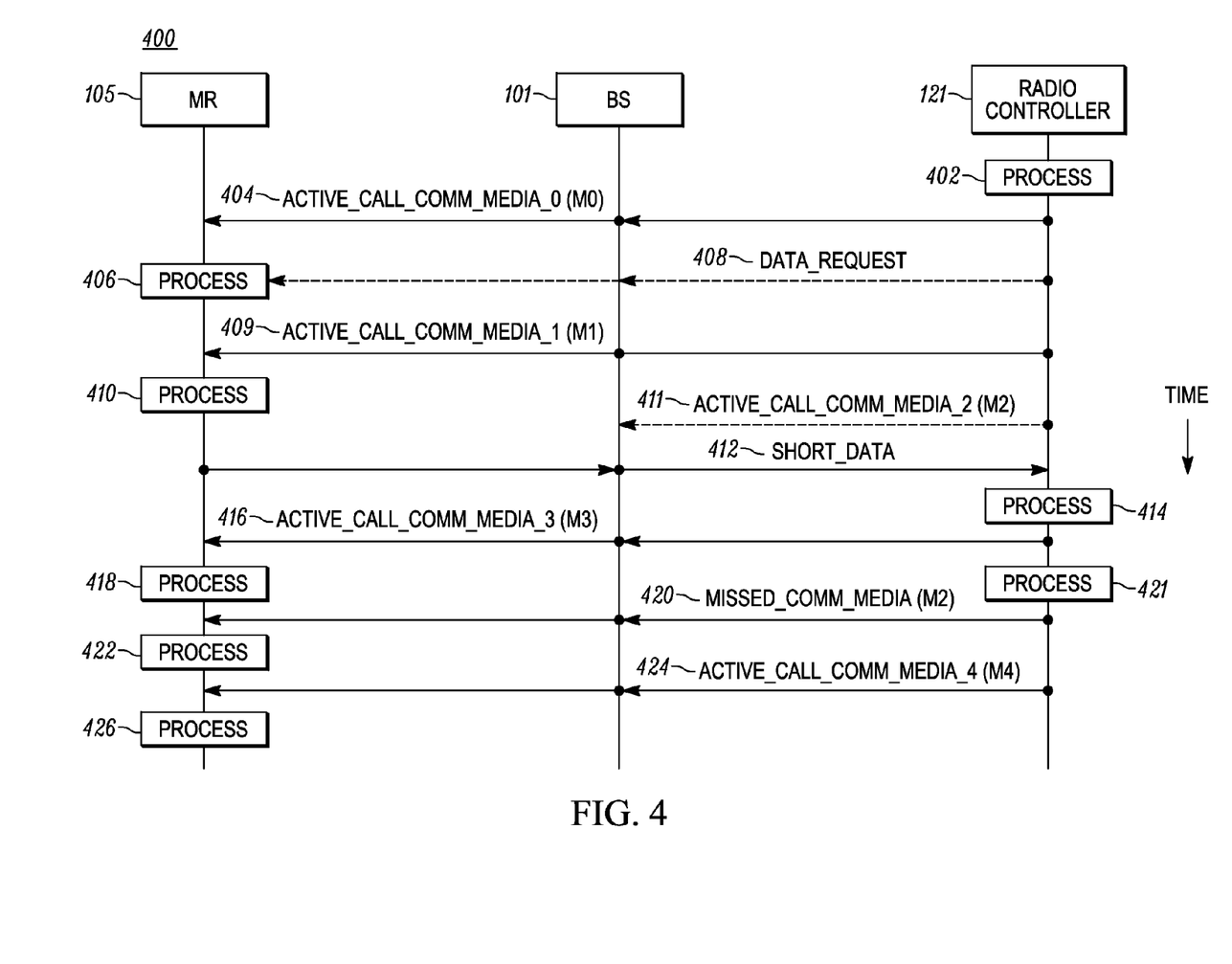
FIG. 4 is a ladder diagram illustrating a process for transmitting short data during an active time division multiple access (TDMA) call in accordance with an embodiment.

FIG. 4 sets forth a ladder diagram 400 illustrating processing steps, message transmissions, and message receptions across MR 105, BS 101, and radio controller 121 of FIG. 1 for transmitting short data during an active TDMA call in accordance with an embodiment. Time progresses from top to bottom with respect to the processing steps, message transmissions, and message receptions of FIG. 4.

Figure 5:
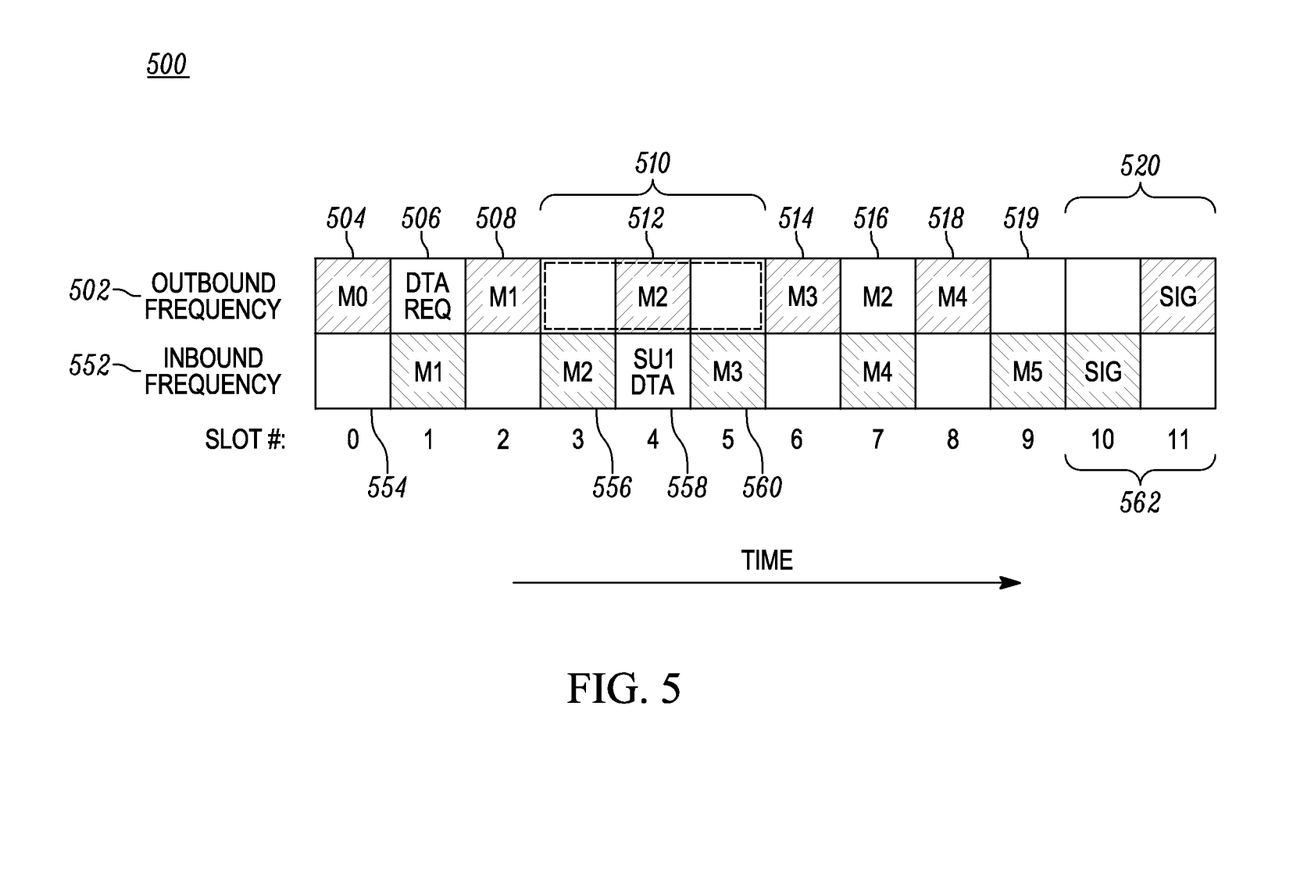
FIG. 5 is a timing diagram of a process for transmitting short data during an active TDMA call in accordance with an embodiment.

FIG. 5 sets forth an example timing diagram 500 illustrating the relative timing of data transmissions and receptions sets forth in FIG. 4 in a TDMA system with a slotting ratio of n=2 in accordance with an APCO P25 phase 2 protocol, in accordance with an embodiment. FIGS. 4 and 5 will be described in a combined fashion without repeatedly distinguishing between the figures, such that any reference character beginning with a four ("4") should be interpreted as referring to FIG. 4 and any reference character beginning with a five ("5") should be interpreted as referring to FIG. 5. And while FIGS. 4 and 5 will be described together for ease of description, each figure is intended to also stand on its own and should not be considered limiting on what the other figure discloses. For example, similar considerations as set forth in FIG. 4 can be similarly applied to other TDMA systems having higher slotting ratios and/or implementing other TDMA protocols than that set forth in FIG. 5, and can be similarly applied to other protocols have more than one repeating time slot per logical channel as set forth in FIG. 5. Other variations are possible as well.

In FIG. 5, time progresses left to right with respect to an outbound frequency 502 on which a first outbound TDMA logical channel (shaded slot #'s 0, 2, 4, 6, 8) and a second outbound TDMA logical channel (unshaded slot #'s 1, 3, 5, 7, 9) appear and with respect to an inbound frequency 552 on which an inbound logical data channel (unshaded slot #'s 0, 2, 4, 6, 8) and a second inbound logical channel (shaded slot #'s 1, 3, 5, 7, 9) appear. Signaling space 520 (slots 10 and 11 on the outbound frequency) and 562 (slots 10 and 11 on the inbound frequency) round out a single respective superframe consistent with the APCO P25 standard.

FIGS. 4 and 5 illustrate a call scenario that may be either an individual call or a group call. MR 105 is illustrated as receiving an active call from the system infrastructure (via radio controller 121 and BS 101 in this example) that may be originally sourced from any one of MRs 109, 155, and 159 transmitting on the second inbound logical channel of the inbound frequency 552, and which may be destined for the individual MR 105 or a talkgroup to which MR 105 subscribes or is otherwise associated. In other embodiments, the inbound portion of the active call may be assigned to a different inbound frequency than the same inbound frequency 552 as the inbound logical data channel. Furthermore, while the second outbound TDMA logical channel and the inbound logical data channel are described below as a dedicated data channel pair, in other embodiments, the pair of channels may be a traffic channel normally available for assigning calls but which is temporarily used and/or assigned by the radio controller for short data transmission purposes. In still further embodiments, the second outbound TDMA logical channel and the inbound logical data channel may not be paired but may instead be individually and separately assigned for the short data transmission purposes set forth herein. Other possibilities exist as well.

Additional processing steps, receptions, and/or transmissions not disclosed herein could be additionally added before, after, or in-between steps, receptions, and/or transmissions disclosed in FIGS. 4 and 5, and the presence of such additional steps, receptions, and/or transmissions would not negate the purpose and advantages of the examples set forth in detail throughout the remainder of this disclosure. Furthermore, while a particular order of processing steps, message receptions, and/or message transmissions is indicated in FIGS. 4 and 5 for exemplary purposes, timing and ordering of such steps, receptions, and transmissions may vary where appropriate without negating the purpose and advantages of the examples set forth in detail throughout the remainder of this disclosure. Finally, while in this example the outbound frequency 502 and the inbound frequency 552 are handled by a same BS 101, in other embodiments, separate BSs may handle the outbound frequency 502 and the inbound frequency 552 and may separately interface with radio controller 121.

As illustrated in FIG. 4, during an already active call, radio controller 121 receives communication media from a source MR, processes the communication media at step 402, and forwards the communication media to MR 105 as a target destination of the communication media via BS 101 as active_call_comm_media_0 404. The active_call_comm_media_0 404 transmission may correspond, for example, to communication media M0 transmitted in slot 0 509 of the first outbound TDMA logical channel on outbound frequency 502 in FIG. 5. Communication media M0 may have been received on the inbound frequency 552 in a slot of a prior superframe before slot 0 554.

In some embodiments, and also at step 402, the radio controller 121 may determine that MR 105 should transmit short data. The radio controller may determine that MR 105 should transmit short data based on a number or combination of parameters, including but not limited to a threshold amount of time passing since it last received a location update or sensor information update from MR 105 (e.g., such as 30 seconds-30 minutes), a request being received from a console device requesting updated location or sensor information from MR 105, a priority of the MR 105 relative to other MRs known to controller device 121, a priority of a group to which MR 105 is subscribed relative to other groups of MRs, or some other reason or condition. In response to the determination, the radio controller 121 generates a request message and transmits the request message to the MR 105 as data_request 408. In some embodiments, the data_request 408 may request that the MR 105 transmit an indicated or implied type of short data immediately, at a next available opportunity, or at some time in the future (e.g., the radio controller 121 may schedule the MR's 105 transmission of short data at some time in the future in accordance with an availability of the inbound logical data channel and/or other inbound channels, and in accordance with prior scheduled short data transmissions of other MRs, and the request may indicate a future time slot on the inbound logical data channel and/or other inbound channels during which to transmit). The type of short data being requested may be a location or sensor information, and may be indicated in the request, or may be implied upon receipt of the request based on mere receipt of the request or based on other information in the request. Furthermore, the data request message may specify the particular inbound logical data channel and/or inbound frequency on which to transmit the short data by channel frequency, by channel slot, by channel identifier, by other channel parameter, and/or by index number, among other possibilities.

The data_request message 408 may be transmitted in a time slot 506 of the second outbound TDMA logical channel, assuming it is available. The MR 105 may thus not only receive active call communication media on the first outbound TDMA logical channel of the outbound frequency 502, but may also monitor one or more or all additional logical channels on the outbound frequency 502 for signaling such as the data_request 408 or, as described in more detail below, for missed communication media. The data_request 408 may identify MR 105 by its unique MR identifier or by an assigned index number, or may set forth a schedule and mapping that sets forth, for each of a plurality of MRs (which may include all MRs in a same talkgroup as MR 105 for the active call), a schedule for transmitting short data on the inbound logical data channel during the active call. In other embodiments in which the outbound frequency 502 has a slotting ratio>2, the data_request 408 may be sent on any available logical channel, and/or could be sent in any available signaling space 520.

At step 406, the MR 105 receives the active_call_comm_media_0 404 message, processes the message and determines that it is an (for a group call) or the (for an individual call) intended recipient of the message, extracts media information, such as voice, audio, video, image, or text from the message, and plays back the media (e.g., via a speaker for audio or voice and/or a display for image, video, or text). Also at step 406, the MR 105 detects a request to transmit short data. Detecting the request to transmit short data may include detecting expiration of a periodic or semi-periodic timer that determines an interval at which to capture and/or transmit short data such as current location data or sensor data, detecting a user input associated with a request to capture and/or transmit such short data, detecting a change in distance from a previously reported location greater than a threshold amount, or detecting receipt of an instruction or request to capture and/or transmit short data such as current location data or sensor data (including but not limited to the data_request 408 described above).

Responsive to detecting the request to transmit short data at step 406, and after receiving the next communication media active_call_comm_media_1 409 in slot 2 508 of the first outbound TDMA logical channel (and after processing and playing back the media at step 410 in a same or similar manner to that set forth at step 406), MR 105 switches to a pre-determined inbound logical data channel of a pre-determined inbound traffic frequency, or in some embodiments switches to the inbound logical data channel of the inbound traffic frequency indicated in the data_request 408, and transmits short_data 412 via BS 101 to radio controller 121 (for further storage and/or distribution by radio controller 121). While FIG. 4 illustrates the short_data 412 being transmitted via a same BS 101 as via which the communication media active_call_comm_media_0 404 for the active call was received, in some embodiments, a different BS of a same wireless infrastructure or a different BS of a different wireless infrastructure may be used for the inbound logical data channel.

Because the outbound frequency 502 and the inbound frequency 552 are separated, in an embodiment in which the MR 105 has a single transceiver, the MR 105 must re-program its transceiver to the frequency associated with the inbound frequency 552, which takes some non-zero period of time (illustrated in FIG. 5 as occurring during time slot 3 556). Because the outbound frequency 502 and inbound frequency 552 are time-aligned, MR 105 may begin transmitting its short data during slot 4 558 on the inbound frequency 552 as illustrated, without separately obtaining synchronization via other signaling mechanisms. After transmitting the short data during slot 4 558, in the embodiment in which the MR 105 has a single transceiver used for both transmit and receive functions, the MR 105 must re-program its transceiver to the frequency associated with the outbound frequency 502, which again takes some non-zero period of time (illustrated in FIG. 5 as occurring during time slot 5 560). In an embodiment in which entirely separate receive and transmit chains are provided at MR 105, MR 105 would still likely be unable to receive the M2 communication media in slot 512 while also transmitting short data due to receiver desense, and thus the same mechanisms as described herein may be used in such situations as well.

As shown in FIGS. 4 and 5, while the MR 105 is transmitting the short_data 412, the radio controller 121 causes second communication media of the active call (active_call_comm_media_2 411) to be broadcast on the first outbound TDMA logical channel during slot 512. Because MR 105 is away from the outbound frequency 502 or because it is transmitting short data in slot 4 558, it misses and/or cannot receive the second communication media active_call_comm_media_2 411 transmitted in slot 4 512.

At step 414, the radio controller 121 receives the short_data 412, extracts the data (e.g., such as location or sensor data) from the short_data 412 message, and processes, stores, and/or otherwise further distributes the data.

In this example in which short data sufficient to fit in a single slot (slot 4 558) is transmitted by MR 105, MR 105 can return to (or again receive on) the outbound frequency 502 in time to receive the next communication media M3 in slot 6 514 (e.g., active_call_comm_media_3 416 of FIG. 4) of the active call, and thus is only away from the outbound frequency 502 for the time period 510 indicated via dashed lines in FIG. 5.

At step 418, the MR 105 receives the active_call_comm_media_3 416 message, processes the message and determines that it is an or the intended recipient of the message, extracts media information from the message, and delays playback of the media as it determines, from the time away from the first outbound TDMA logical channel or from an order indicator in the active_call_comm_media_3 416 message itself, that it is missing communication media for the active call.

At step 421, the radio controller 121, either because the radio controller 121 only instructed MR 105 to transmit one slot's worth of short data or because it received short data from MR 105 only during slot 4 558 on the inbound logical data channel (and not on any subsequent slots), obtains sufficient information to infer that that MR 105 missed communication media M2 during slot 512 of the active call. In some embodiments, BS 101 may report the time at which it received the short data to the radio controller 121 and/or to another BS hosting the active call (if different), and the radio controller 121 may determine, itself or with the aid of the another BS, during what slot or slots of the first outbound TDMA logical channel the short data was received on the inbound logical data channel. In other embodiments where the BS 101 has knowledge of the slotting structure of the first outbound TDMA logical channel and how the first outbound TDMA logical channel is synchronized to the inbound logical data channel, may directly inform the radio controller during what slot or slots of the first outbound TDMA logical channel the short data was received on the inbound logical data channel. As a result, the radio controller 121 determines that it must provide the missed communication media M2 in a re-transmission of the missed communication media at a next available opportunity on the second outbound TDMA logical channel. In this case, the radio controller 121 determines that the second outbound TDMA logical channel is still free, and provides the missing communication media (i.e., active_call_comm_media_2 411) as missed_comm_media 420 in slot 516 on the second outbound TDMA logical channel. Advantageously, the radio controller 121 can make the determination of what communication media MR 105 missed on its own, without requiring MR 105 to separately request re-transmission of missed communication media, saving additional time and bandwidth and ensuring a more artefact-free reproduction of media at the MR 105 despite its intervening transmission of short data. In other embodiments, the BS 101 may store each active_call_comm_media message for a period of time, and the radio controller 121 may, at the time indicated in FIG. 4, simply transmit an instruction to BS 101 to re-transmit the identified active_call_comm_media message (active_call_comm_media_2 (M2) in this case) in a subsequently identified slot or slots.

At step 422, the MR 105 receives the missed_comm_media 420, processes the message and determines that it is an or the intended recipient of the message, extracts media information from the message, re-orders the communication media as necessary with respect to the previously received but delayed active_call_comm_media_3 416, and plays back the (re-ordered, in this case) media.

At step 426, the MR 105 returns to normal call processing by receiving subsequent active_call_comm_media 424 in slot 8 518 of the first outbound TDMA logical channel, processes the message and determines that it is an or the intended recipient of the message, extracts media information from the message, and plays back the media, just as it did for active_call_comm_media_0 404.

Although a particular sequence was illustrated in FIGS. 4-5, many variations of that sequence may occur without affecting the advantages and benefits of the underlying process. For example, although only one slot's worth of short data was illustrated as being transmitted on the inbound logical data channel in FIG. 5, amounting to approximately 12-14 bytes of data (that given a location or data sensor size of 6-12 bytes amounts to approximately 1-2 short data updates per slot), the MR 105 may transmit larger or more short data across more than one slot of the inbound logical data channel, potentially missing more than one communication media transmission of the active call on the first outbound TDMA logical channel. In a system with a slotting ratio of 2, as illustrated in FIG. 5, additional sequential or non-sequential second outbound TDMA logical channel slots (such as slot 519 of FIG. 5) could be used to re-transmit additional missed active call communication media until all missed media has been provided to the MR 105. In a system in which the slotting ratio is greater than 2, additional logical channels on the outbound frequency 502 may be checked for availability by the radio controller 121, and more than one missed communication media provided to the MR 105 in additional available outbound TDMA logical channels between each subsequent active call communication media. Furthermore, while the example above illustrated a case in which the radio controller 121 receives scheduled or requested data during slot 4 558 of the inbound logical data channel, in embodiments in which more than one MR (e.g., when the data_request 508 identifies a group of MRs to transmit short data via a random access inbound logical data channel) attempts to transmit short data during slot 4 558 and the BS 101 reports a collision and/or otherwise receipt of a signal but no decipherable information to radio controller 121, radio controller 121 may still infer that at least two MRs missed one or more communication media on the first outbound TDMA logical channel, and may still re-transmit the missed one or more communication media in one or more subsequent slots on the second outbound TDMA logical channel for receipt by the (unidentified) MRs whose transmissions collided.

Still further, while in FIG. 5 the MR 105 detected a request to transmit short data during time slot 506 and waited for a next available communication media of the active call (M1 in slot 2 508) before moving to the inbound frequency 552 to transmit short data, in other embodiments, MR 105 may instead immediately go to the inbound frequency 552, which may be time-aligned with the outbound frequency 502 but not necessarily slot-aligned in the manner illustrated in FIG. 5 (e.g., slots 3-5 of the inbound frequency 552 may occur during slots 2-4 of the outbound frequency 502), and rely on the radio controller 121 to infer that MR 105 left the outbound frequency 502 immediately and to subsequently provide the missed communication media from slot 2 508 (and slot 4 512 as well) in one or more other outbound TDMA logical channels when MR 105 returns to the outbound frequency 502. Finally, while in FIG. 5 the MR 105 returns to the outbound frequency 502 in time to first receive a communication media (M3 in slot 6 514) of the active call before receiving any missed communication media, in other embodiments, the MR 105 may return to the outbound frequency 502 and first receive a re-transmitted missed communication media prior to receiving a next communication media of the active call, and re-order the media accordingly and as necessary (including if at all) before playing it back.

III. Conclusion

In accordance with the foregoing, an improved method, apparatus, and system for transmitting short data during an active TDMA call in a wireless communication system is disclosed. As a result, MRs in groups experiencing high voice activity are still able to make periodic, semi-periodic, or intermittent transmissions of data, preventing infrastructure applications relying upon such data from being starved of information that may be critical to the safety and well-being of MR users. Other advantages and benefits are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of transmitting short data during an active time division multiple access (TDMA) call in a wireless communication system, the method comprising:
   receiving, via a transceiver at a mobile radio, first communication media of an active call in a first slot of a first outbound TDMA logical channel of an outbound traffic frequency having a slotting ratio n>=2;
   detecting, at the mobile radio, a request to transmit short data, and responsively:
      switching, via the transceiver, from the outbound traffic frequency to an inbound traffic frequency different from the outbound traffic frequency;
      transmitting, via the transceiver, during at least a portion of a second slot of the first outbound TDMA logical channel, pending short data on an inbound logical data channel of the inbound traffic frequency;
      after transmitting the short data on the inbound logical data channel, switching, via the transceiver, from the inbound traffic frequency to the outbound traffic frequency and:
         receiving, via the transceiver, second communication media of the active call in a third slot of the first outbound TDMA logical channel; and
         receiving, via the transceiver, missed communication media of the active call in a first slot of a second outbound TDMA logical channel of the outbound traffic frequency, the missed communication media missed during transmitting of the pending short data and is received as a function of a radio controller in the wireless communication system identifying the missed communication media as transmitted during a time at which the mobile radio was transmitting the short data and without the mobile radio specifically identifying the missed communication media to the radio controller; and
      playing back media from the missed and the second communication media.

2. The method of claim 1, wherein the inbound logical data channel is a TDMA logical channel that is slot aligned with the first outbound TDMA logical channel.

3. The method of claim 1, wherein the second outbound TDMA logical channel and the inbound logical data channel comprise a dedicated data channel pair.

4. The method of claim 1, wherein the second outbound TDMA logical channel is a outbound traffic channel that is not currently assigned to an active call.

5. The method of claim 1, wherein detecting, at the mobile radio, a request to transmit short data comprises receiving, via the transceiver during a slot of the second outbound TDMA logical channel prior to the first slot, a request from the infrastructure to transmit short data, the request identifying an indicated slot on the inbound logical data channel to transmit the short data.

6. The method of claim 5, wherein the request identifies the inbound logical data channel and time slot on which to transmit the short data.

7. The method of claim 1, wherein the short data is one of a location update of the mobile radio and sensor data associated with a user of the mobile radio.

8. The method of claim 1, wherein detecting, at the mobile radio, the request to transmit short data comprises determining that a threshold period of time has passed since a last short data transmission has been sent or that a threshold distance has been travelled since the last short data transmission has been sent.

9. The method of claim 1, wherein detecting, at the mobile radio, the request to transmit short data comprises detecting activation, via an input interface of the mobile radio, of an input associated with a request to transmit the short data.

10. A radio controller in a wireless infrastructure network, the radio controller comprising:
   a transceiver;
   a processor; and
   a computer readable medium having instructions stored thereon that, in response to execution by the processor, cause the radio controller to perform a set of functions comprising:
      cause, during an active call, first communication media of the active call to be provided to a first mobile radio in a first slot of a first outbound TDMA logical channel of an outbound traffic frequency having a slotting ratio n>=2;
      during the active call, receive, from the first mobile radio via an inbound logical data channel of an inbound traffic frequency different from the outbound traffic frequency, short data associated with the first mobile radio;
      identify a time period during which the mobile radio was transmitting the short data and identifying, as a function of the time period and without receiving any identification of missed communication media from the mobile radio, missed communication media transmission of the active call provided in a second slot of the first outbound TDMA logical channel while the first mobile radio was transmitting the short data; and
      during the active call, cause the identified missed communication media transmission to be re-transmitted to the first mobile radio in a first slot of a second outbound TDMA logical channel of the outbound traffic frequency.

11. The radio controller of claim 10, wherein the inbound logical data channel is a TDMA logical channel that is slot aligned with the first outbound TDMA logical channel.

12. The radio controller of claim 10, wherein the second outbound TDMA logical channel and the inbound logical data channel comprise a dedicated data channel pair.

13. The radio controller of claim 10, wherein the second outbound TDMA logical channel is a traffic channel, the functions further comprising determining that the second outbound TDMA logical channel is not currently assigned to an active call and is thus available for use in transmitting the missed communication media.

14. The radio controller of claim 10, the functions further comprising causing a request to transmit short data to be transmitted to the mobile radio during a slot of the second outbound TDMA logical channel prior to the first slot requesting transmission of the short data, the request identifying an indicated slot on the inbound logical data channel to transmit the short data.

15. The radio controller of claim 14, wherein the request identifies the inbound logical data channel and time slot on which to transmit the short data.

16. A method for receiving short data during an active time division multiple access (TDMA) call in a wireless communication system, the method comprising:
   causing, at a radio controller during an active call, first communication media of the active call to be provided to a first mobile radio in a first slot of a first outbound TDMA logical channel of an outbound traffic frequency having a slotting ratio n$>=2$;
   during the active call, receiving, at the radio controller during from the first mobile radio via an inbound logical data channel of an inbound traffic frequency, short data associated with the first mobile radio;
   identifying, by the radio controller, a time period during which the mobile radio was transmitting the short data and identifying, as a function of the time period and without receiving any identification of missed communication media from the mobile radio, missed communication media transmission of the active call provided in a second slot of the first outbound TDMA logical channel while the first mobile radio was transmitting the short data;
   during the active call, causing, by the radio controller, the identified missed communication media transmission to be re-transmitted to the first mobile radio in a first slot of a second outbound TDMA logical channel of the outbound traffic frequency.

* * * * *